United States Patent [19]

Fogarty

[11] Patent Number: 5,137,441
[45] Date of Patent: Aug. 11, 1992

[54] MOLD ASSEMBLY FOR MAKING AN OCULAR LENS BLANK

[75] Inventor: Terence M. Fogarty, Hudson, Wis.

[73] Assignee: Minnesota Mining and Manufacturing Company, St. Paul, Minn.

[21] Appl. No.: 605,916

[22] Filed: Oct. 30, 1990

[51] Int. Cl.[5] ............................................. B29D 11/00
[52] U.S. Cl. .................................... 425/412; 264/1.1; 264/2.7; 425/808; 249/160
[58] Field of Search ................. 425/808, 174.4, 346, 425/412; 249/52, 61, 83, 96, 97, 142, 160; 264/1.1, 2.1, 2.2, 2.3, 2.4, 2.7, 162

[56] References Cited

U.S. PATENT DOCUMENTS

| | | | |
|---|---|---|---|
| 3,697,629 | 10/1972 | Bronstein | 264/1 |
| 3,761,208 | 9/1973 | Boudet et al. | 425/352 |
| 3,773,868 | 11/1973 | Bronstein | 264/1 |
| 3,840,977 | 10/1974 | Dimitracopoulos | 425/808 |
| 4,113,224 | 9/1978 | Clark et al. | 249/105 |
| 4,121,896 | 10/1978 | Shepherd | 425/412 |
| 4,165,158 | 8/1979 | Travnicek | 351/160 H |
| 4,166,088 | 8/1979 | Neefe | 264/1 |
| 4,179,484 | 12/1979 | Neefe | 264/1 |
| 4,188,353 | 2/1980 | Neefe | 264/1 |
| 4,197,266 | 4/1980 | Clark et al. | 264/1 |
| 4,208,364 | 6/1980 | Sheperd | 264/1 |
| 4,208,365 | 6/1980 | Le Fevre | 264/1 |
| 4,209,289 | 6/1980 | Newcomb et al. | 425/410 |
| 4,229,390 | 10/1980 | Neefe | 264/1 |
| 4,239,712 | 12/1980 | Neefe | 264/1 |
| 4,254,065 | 3/1981 | Ratkowski | 264/205 |
| 4,284,399 | 8/1981 | Newcomb et al. | 425/410 |
| 4,347,198 | 8/1982 | Ohkada et al. | 264/2.3 |
| 4,382,902 | 5/1983 | Feurer | 264/1.4 |
| 4,407,766 | 10/1983 | Haardt et al. | 264/2.2 |
| 4,457,880 | 7/1984 | Neefe | 264/1.4 |
| 4,469,646 | 9/1984 | Rawlings | 264/2.2 |
| 4,497,754 | 2/1985 | Padoan | 264/1.4 |
| 4,562,018 | 12/1985 | Neefe | 264/2.7 |
| 4,597,918 | 7/1986 | Neefe | 264/2.6 |
| 4,749,530 | 6/1988 | Kunzler | 264/2.7 |
| 4,786,444 | 11/1988 | Hwang | 264/1.4 |
| 4,836,960 | 6/1989 | Spector et al. | 264/2.2 |
| 4,865,779 | 9/1989 | Ihn et al. | 264/1.1 |
| 4,874,561 | 10/1989 | Spector | 425/808 |
| 4,944,899 | 7/1990 | Morland et al. | 425/808 |
| 4,955,580 | 9/1990 | Seden et al. | 425/808 |
| 4,985,186 | 1/1991 | Nose et al. | 425/808 |

FOREIGN PATENT DOCUMENTS

| | | |
|---|---|---|
| 1098665 | 4/1981 | Canada . |
| 0035310 | 9/1981 | European Pat. Off. . |
| 0051027 | 5/1982 | European Pat. Off. . |
| 2027386 | 2/1980 | United Kingdom . |
| 2187999 | 9/1987 | United Kingdom . |
| 2219241 | 12/1989 | United Kingdom . |

OTHER PUBLICATIONS

Machinery's Handbook, 15th ed. New York, The Industrial Press, 1956, pp. 1411-1412.

Primary Examiner—Jay H. Woo
Assistant Examiner—James P. Mackey
Attorney, Agent, or Firm—Gary L. Griswold; Walter N. Kirn; James D. Christoff

[57] ABSTRACT

An assembly for molding an ocular lens blank which may be lathed into a contact lens or intraocular lens includes a sleeve, and a first and second mold segment placed within the sleeve. After a lens blank is molded in a space between the two segments and the sleeve, the two segments are removed from the sleeve and the second mold segment then functions as a holder for the lens blank during a lathing operation. The second mold segment has an outer cylindrical surface for gripping by a collet, and also has an internal frustoconical recess for a mounting pin, and thus can be used with a variety of lathes known to the optical industry.

9 Claims, 3 Drawing Sheets

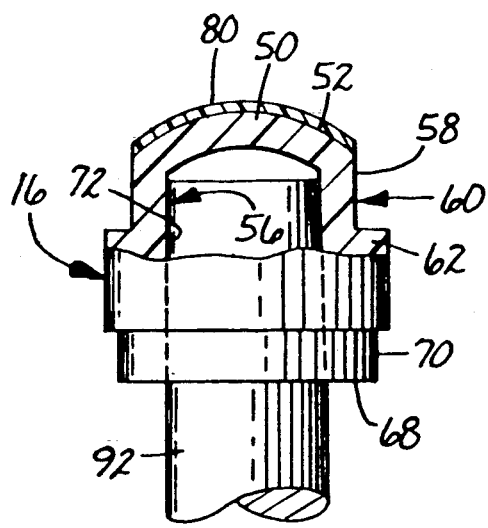
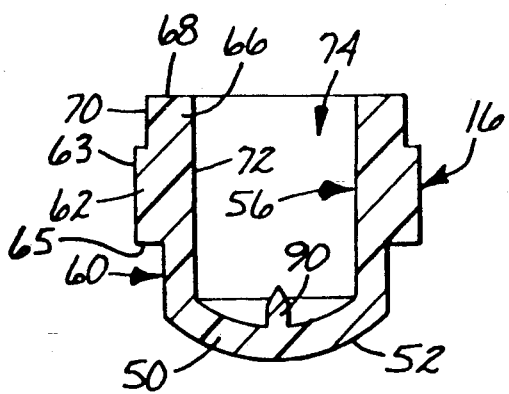
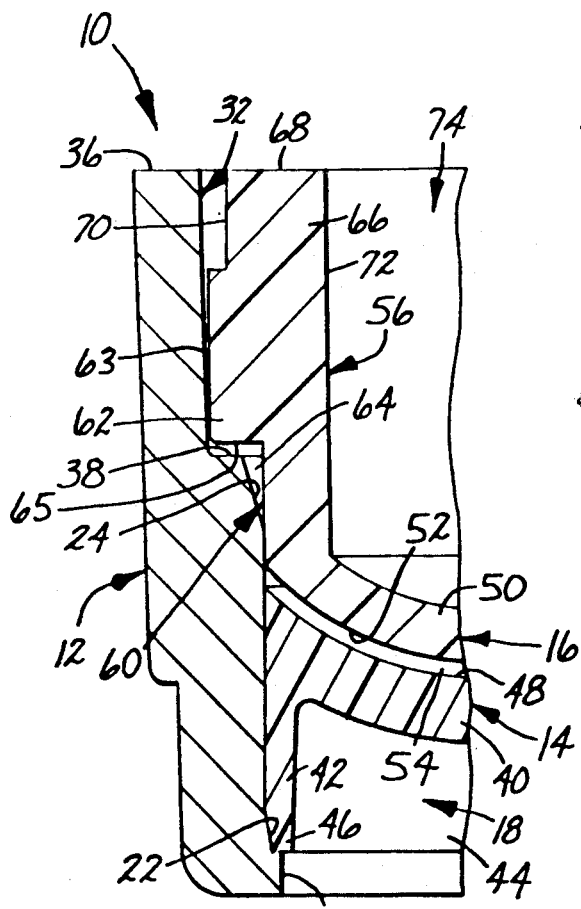
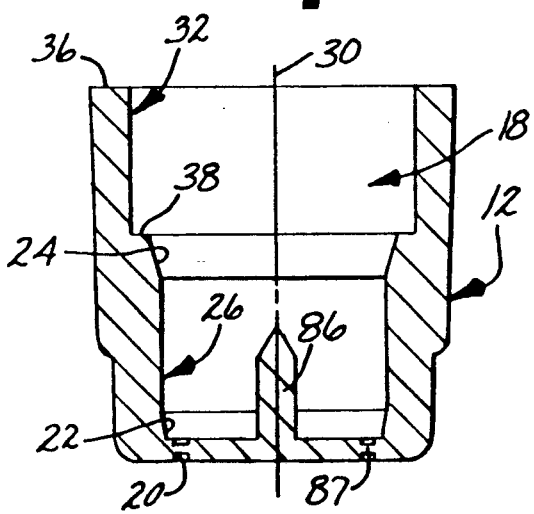
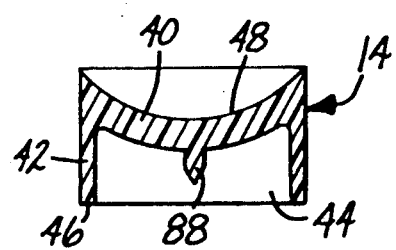

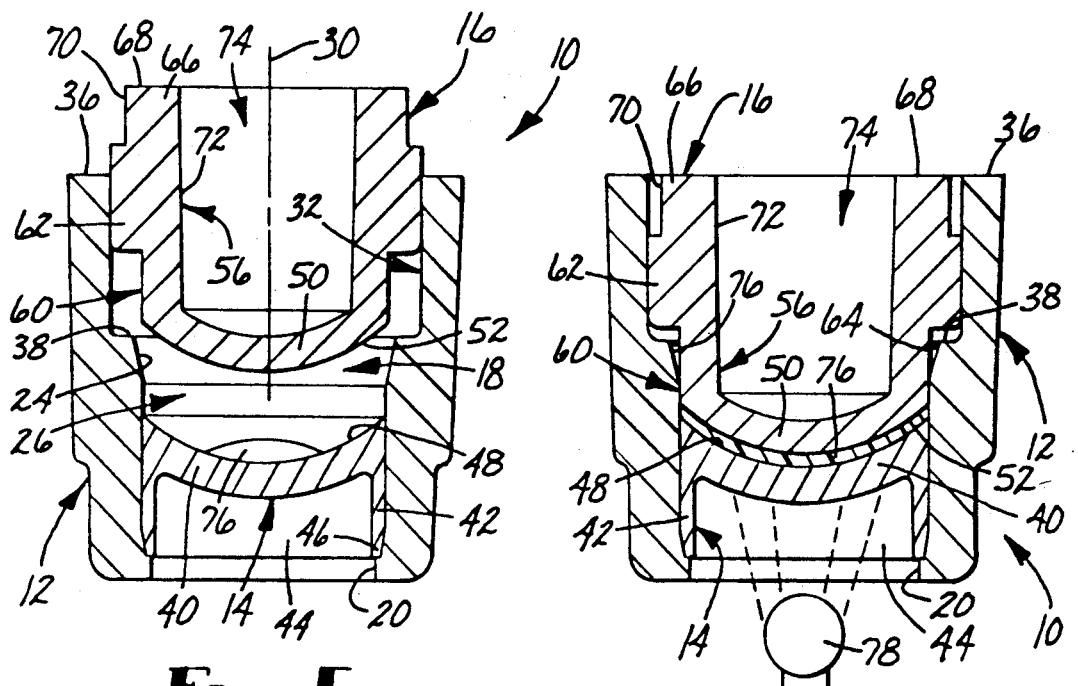
Fig. 5
Fig. 6
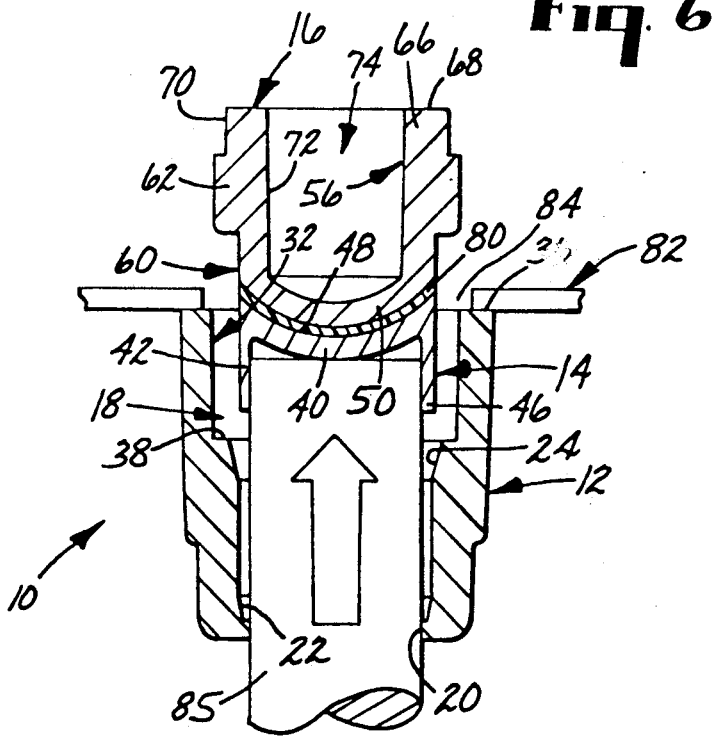
Fig. 7

MOLD ASSEMBLY FOR MAKING AN OCULAR LENS BLANK

BACKGROUND OF THE INVENTION

1. Field of the Invention

This invention concerns an assembly for molding an ocular lens blank which is later lathed to make an intraocular lens or a contact lens.

2. Description of the Related Art

Many types of ocular lenses are sold by manufacturers to retailers, opticians, optometrists and ophthalmologists as a finished product that is ready to wear. In some circumstances, however, lens blanks are purchased from the manufacturer and then lathed and finished to make a lens having a desired prescription. Lens blanks are particularly useful for making lenses having unusual prescriptions that might be difficult to obtain directly from the manufacturer.

Lens blanks are often cut into the shape of a thick button from rod stock or sheet stock. The blank is mounted in a collet and one side is lathed, often by initially using a roughing lathe before a finishing lathe is used in order to extend the life of the finishing tool. Next, the blank is affixed by wax to a pedestal and the pedestal is secured to mounting equipment of the lathe and the second face of the blank is both rough lathed and finish lathed.

Various types of lathes are used by optical labs, and thus the shape of the pedestal may vary from lab to lab. For example, some optical labs have lathes with collets adapted to grip an outer, cylindrical surface of a pedestal. Other labs have lathes with a mounting pin having a zero Morse taper which is shortened from two inches to one inch and which is adapted to fit within a complemental, tapered recess of a pedestal.

It has also been proposed to make relatively thick lens blanks in one-piece, cup-shaped molds having a base which is adapted to be mounted on a holding jig of a lathe. In this manner, the blank need not be re-mounted on a pedestal. Recently, there has been increased interest in the use of cup-shaped molds for making lens blanks, since the bottom of the cup-shaped recess may have particular dimensions and contour in order to mold one side of the blank into a particular configuration, and thus only the remaining side of the blank need be lathed by the optical lab. Such molds reduce lathing time (particularly when the molding materials are difficult to lathe) and are especially useful for making multifocal, toric, aspheric and other lens having posterior surfaces that are difficult to replicate. Conventionally, a rough lathing tool is used to remove the bulk of the blank material as well as the sides of the cup-shaped mold before a finish lathing tool is used on the remaining side of the blank.

In recent years, improved compositions for ocular lens molding materials have been developed (such as the compositions described in U.S. Pat. No. 4,818,801) but often are very expensive relative to conventional materials. It would be advantageous to make lens blanks as thin as feasible when using such improved compositions, in order to reduce the costs of the blank and also lower internal stresses in the molded and finished lens. However, thin lens blanks are more difficult to handle and mount than the thicker, typical lens blanks when using the conventional methods described above. Moreover, the rough lathing step used in conventional methods is somewhat time-consuming.

SUMMARY OF THE INVENTION

The present invention is directed toward a mold assembly for making an ocular lens blank. The assembly includes a sleeve having a passage, a first mold segment connected to the sleeve, and a second mold segment which is removably received in the passage at a location spaced from the first mold segment to present a mold cavity therebetween. The second mold segment includes a central section and a tubular section connected to the central section. The tubular section includes an outer cylindrical surface remote from the central section for gripping by a collet. The tubular section also includes a recess and an inner wall facing the recess having a frustoconical configuration for optional mounting by a holder.

The second mold segment is useful as a mounting device for holding a lens blank in a lathe, and can be used either with lathes having a collet or lathes having a tapered pin holder. Consequently, the mold segment is compatible with various types of lathes used in the optical industry and there is no need to re-mount the lens blank in a pedestal during either the lathing operation or a subsequent polishing operation. The assembly is useful for making relatively thin lens blanks (e.g., 0.0072 inch) and the need for a rough lathing operation as is used for making conventional, thicker blanks (e.g., on the order of 0.187 inch) is generally avoided.

BRIEF DESCRIPTION OF THE DRAWINGS

FIG. 1 is a fragmentary side cross-sectional view of a mold assembly constructed in accordance with the invention;

FIG. 2 is a reduced, side cross-sectional view of a sleeve of the assembly of FIG. 1, additionally showing a sprue connection for making the sleeve;

FIG. 3 is a reduced, side cross-sectional view of a first mold segment of the assembly shown in FIG. 1, additionally illustrating a sprue connection for making the segment;

FIG. 4 is a reduced, side cross-sectional view of a second mold segment of the assembly shown in FIG. 1, along with a sprue connection for molding the segment;

FIG. 5 is a reduced, cross-sectional view of the assembly shown in FIG. 1, except that mold material for making an ocular device has been placed in the assembly and the second mold segment is shown in its initial stages of movement toward the first mold segment;

FIG. 6 is a view similar to FIG. 5 except that the second mold segment has moved to a certain position to define a mold cavity, and a source of radiation (shown schematically) has been activated to initiate curing of the mold material;

FIG. 7 is a reduced view somewhat similar to FIG. 6 except that the sleeve has been placed next to a holding jig, and an ejector is in contact with the first mold segment for pushing both the first mold segment and the second mold segment out of the sleeve in order to recover the cured product;

FIG. 10 is a reduced, fragmentary side view in partial section of the second mold segment and lens blank, along with a tapered mounting pin placed within a recess of the segment.

DETAILED DESCRIPTION OF THE PREFERRED EMBODIMENT

Figure 8:
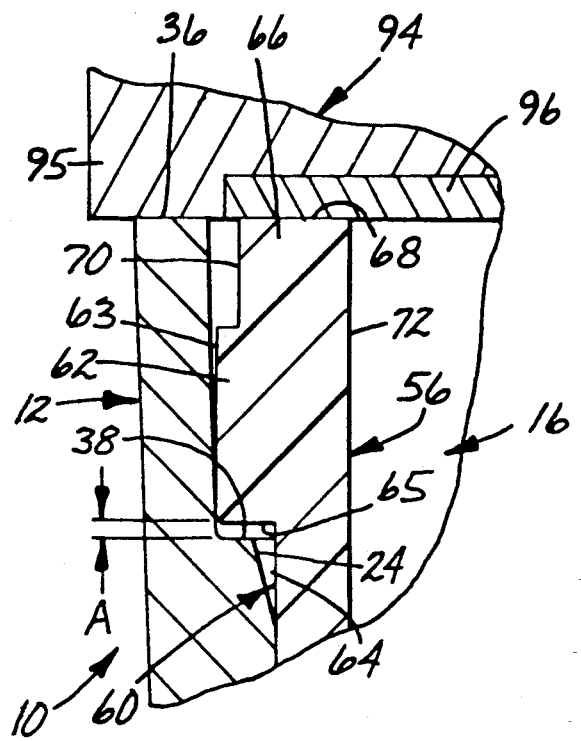
FIG. 8 is a fragmentary view of part of the assembly shown in FIG. 1 along with a closure mechanism for use when the assembly is used in a tracking mode.

A mold assembly 10 for making an ocular device is shown in FIGS. 1 and 5-7 and includes a sleeve 12, a first mold segment 14 and a second mold segment 16 that are shown individually in FIGS. 2-4 respectively. The sleeve 12 has a central, elongated passage 18 which removably receives the segments 14, 16 to make the molded ocular device.

Referring now to FIGS. 1 and 2, the sleeve 12 is generally cylindrical and includes an inwardly extending, ring-shaped flange 20 that is formed along the entire circumference of the passage 18. The sleeve 12 also has a first frustoconical surface 22 next to the passage 18 and positioned such that its smallest diameter is adjacent the flange 20. The sleeve 12 includes a second frustoconical surface 24 along with a cylindrical section 26 that interconnects the surfaces 22, 24. The cylindrical section 26 has a central longitudinal axis that coincides with a central longitudinal axis 30 of the passage 18.

The sleeve 12 has a frustoconical surface portion 32 next to the passage 18 and remote from the flange 20. The frustoconical portion 32 extends at a non-zero angle relative to the axis 30. The sleeve 12 also has an outer, flat, annular end 36 which extends in a plane perpendicular to the axis 30, along with a radially-extending shoulder 38 which integrally connects the frustoconical portion 32 to the second frustoconical surface 24.

Turning now to FIGS. 1 and 3, the first mold segment 14 has a window or base 40 that is integrally connected to a depending, cylindrical skirt 42 which is hollow to provide a central recess 44. Normally, an end portion 46 of the skirt 42 has an outer diameter equal to the outer diameter of the remainder of the skirt 42 as shown in FIG. 3. However, when the first mold segment 14 is received in the passage 18 as shown in FIG. 1, the end portion 46 is deflected slightly inwardly in a radial direction by the surface 22 and is in interference fit relationship (shown exaggerated) with the surface 22 to thereby establish a leak-resistant fluid seal remote from the base 40. In practice, the skirt 42 is in engagement with the sleeve 12 along its axial length and circumferential extent, but the most effective fluid seal is established next to the first frustoconical surface 22 due to the interference fit. The base 40 has a precisely curved face 48 for molding one side of an ocular device, and the length of the skirt 42 and resulting remoteness of the interference fit of the end portion 46 from the base 40 helps to avoid distortion of the contour of the face 48 when the first mold segment 14 is pulled into the passage 18 abutting the flange 20.

The second mold segment 16 (see FIG. 4) includes a central section 50 with a curved face 52 opposite the face 48 of the first mold segment 14. The second mold segment 16 is movable in the passage 18 to a certain position that is shown in FIG. 1 (as well as FIG. 6) spaced from the first mold segment 14 to define a mold cavity 54 that is bounded by the face 48, the face 52 and part of the cylindrical section 26 of the sleeve 12. The faces 48, 52 form opposite sides of an ocular device that is made from polymer lens molding material which is received and cured in the mold cavity 54.

The second mold segment 16 includes a tubular section 56 integrally connected with the central section 50. An outer cylindrical section 60 of the tubular section 56 has a central axis that coincides with the axis 30 when the second mold segment 16 is in the position shown in FIG. 1.

The second mold segment 16 is circumscribed by an outwardly extending cylindrical portion 62 having an outer cylindrical wall 63 that has a larger diameter than the outer diameter of the cylindrical section 60. When the second mold segment 16 is in the position shown in FIG. 1, part of a lower, radially-extending, annular surface 65 of the cylindrical portion 62 and part of the cylindrical section 60 of the segment 16 along with the second frustoconical surface 24, the shoulder 38 and a lower part of the frustoconical portion 32 of the sleeve 12 combine to define a reservoir chamber 64 for excess material.

An outer end section 66 of the second mold segment 16 has an outermost, flat, annular end 68 which extends in a plane perpendicular to the central axis of the second mold segment 16. The outer end section 66 also includes an outwardly facing cylindrical surface 70 located between the end 68 and the cylindrical portion 62.

An inner wall 72 of the tubular section 56 faces a central recess 74 of the second mold segment 16. The wall 72 is frustoconical and preferably in the shape of a female zero Morse taper that is sized to fit a zero Morse taper pin which has been shortened from 2 inches to 1 inch.

FIGS. 5-7 are exemplary of the steps undertaken in using the assembly 10 to make an ocular device. First, the first mold segment 14 is inserted in the sleeve 12 starting at the end 36 and is advanced along the passage 18 until the outer end of the end portion 46 contacts the upper surface of the flange 20. As the end portion 46 of the skirt 42 reaches the position shown in FIG. 5, the end portion 46 is deflected radially inwardly by the first frustoconical surface 22 (FIGS. 1-2) in order to form an interference fit that (1) establishes a leak-resistant fluid seal, and (2) releasably locks the first mold segment 14 in place. Next, a measured quantity of liquid molding material 76 is placed on top of the face 48 as shown in FIG. 5.

The second mold segment 16 is then brought into position over the sleeve 12 and above the end 36 such that the central axis of the second mold segment 16 is in rough alignment with the longitudinal axis 30 of the passage 18. Next, the second mold segment 16 is advanced toward the first mold segment 14 and into the passage 18 whereupon, in all likelihood, the cylindrical portion 62 (see FIGS. 1 and 4) of the segment 16 contacts one lateral side of the frustoconical portion 32 of the sleeve 12. As the second mold segment 16 continues to advance toward the first mold segment 14, the frustoconical portion 32 function as an alignment means to shift the second mold segment 16 in a direction perpendicular to the axis 30 as may be necessary to precisely align the central axis of the second mold segment 16 with the axis 30 of the sleeve 12 as the second mold segment 16 continues to advance. By the time that the cylindrical section 60 of the second mold segment reaches the cylindrical section 26 of the sleeve 12, the longitudinal axis of the second mold segment 16 is precisely aligned with the axis 30. As such, the curved face 52 does not come into contact with the sleeve 12 such as the shoulder 38, and damage to the face 52 is largely avoided even in instances where the second mold segment 16 is initially unaligned with the axis 30. In this regard, the second frustoconical surface 24 is inclined at a greater angle relative to the axis 30 than the angle of inclination of the frustoconical portion 32 in order to avoid contact with the face 52.

Next, as the second mold segment 16 continues to move toward the first mold segment 14, the cylindrical sections 26, 60 telescopically engage each other and function as a guide means to prohibit shifting of the second mold segment 16 in a direction perpendicular to the axis 30. As the second mold segment 16 moves to the certain position that is shown in FIG. 6 (also shown in FIG. 8), the material 76 is spread throughout the cavity 54, and a portion of the material 76 moves along the sliding cylindrical sections 26, 60 (which are in communication with the cavity 54) in order to lubricate the latter. Excess material is displaced to the reservoir chamber 64.

Next, a light source 78 shown schematically in FIG. 6 is activated to begin curing of the material 76 which includes a photoinitiator that is effective at the wavelength of the light source 78. As the material 76 cures, the material 76 may shrink or expand; however, the lubricated cylindrical sections 26, 60 permit the second mold segment 16 to track such expansion or contraction in a manner that facilitates full contact of the faces 48, 52 with the material 76 at all times so that the surface of the curing material 76 accurately replicates the faces 48, 52. The axial length of sliding contact of the cylindrical sections 26, 60 need only be about 100 microns before the segment 16 reaches the certain position shown in FIGS. 6 and 8.

Preferably, the frustoconical portion 32 is inclined at a taper of 0.25 degrees per side relative to the axis 30. The inclination permits air to escape without undue hindrance as the segment 16 advances. Additionally, the cylindrical wall 63 is sized to present a radial clearance of 0.0002 inch with the frustoconical portion 32 when the second mold segment 16 is in its lowest expected position (such as that shown in FIGS. 6 and 8), in order to provide a gross containment or restriction between the reservoir chamber 64 and the atmosphere external of the assembly 10. The restriction permits air to be vented to the atmosphere, but generally prevents escape of material 76. As this restriction is established, advancement of the segment 16 creates a slight back pressure on the material 76 and encourages the latter to remain in the cavity 54. However, the clearance between the cylindrical wall 63 and the frustoconical portion 32 is sufficient to prevent undue resistance to tracking movement of the cylindrical sections 26, 60 as the material 76 cures.

The use of a three-piece assembly permits the sleeve 12, the first mold segment 14 and the second mold segment 16 to be molded from different plastic materials. The sleeve 12, the first mold segment 14 and the second mold segment 16 are molded from plastic materials which are selected to provide the base 40 with an overall light transmittance value that is greater than the light transmittance value of the sleeve 12 and the second mold segment 16. As a result, photoinitiation of the material 76 generally occurs only in the mold cavity 54, while material in the reservoir chamber 64 and between the interengaged cylindrical sections 26, 60 remains substantially uncured and in a liquid state so as to avoid hindering movement of the second mold segment 16 and provide, if necessary, a source of additional liquid material to the cavity 54. In practice, the second mold segment 16 and the sleeve 12 are opaque, while the first mold segment 14 including the base 40 are translucent in order to admit light to the cavity 54. The lower surface of the base 40 (viewing FIGS. 1 and 3) may be flat to facilitate curing of the material 76 from the center of the cavity 54 and then outwardly in a radial direction.

The light source 78 is deactivated once the material 76 in the cavity 54 has substantially polymerized, and the assembly 10 is subsequently placed in an oven. The material 76 also includes a thermal initiator, so that the flash (i.e., the material in the chamber 64 along with material adjacent the cylindrical surfaces 26, 60) is thermally initiated and polymerized as the assembly 10 is heated while the ocular device 80 (see FIG. 7) is post-cured and/or annealed. Then assembly 10 can be subsequently taken apart without contacting a significant quantity, if any, of uncured liquid material 76.

The assembly 10 is then placed against a jig 82 such that the end 36 of the sleeve 12 contacts edge portions of the jig 82 surrounding an orifice 84. Next, a cylindrical ejector 85 is guided through the flange 20 and into the recess 44 of the skirt 42, and contacts the bottom of the base 40. Continued movement of the ejector 85 in the direction shown in the arrow in FIG. 7 moves the first and second mold segments 14, 16 out of the passage 18, whereupon the ocular device 80 can be recovered. A chuck, tightened around the skirt 42, will loosen the segment 14 from the device 80 while enabling the device 80 to remain attached to the segment 16.

The three-piece mold assembly 10 also permits the selection of particular plastic materials for the segments 14, 16 which have a greater or lesser affinity as desired for the cured mold material of the ocular device 80. For example, if the device 80 is a lens blank which is to be later lathed into the shape of a lens, it may be preferable to have the device 80 remain fixed to the second mold segment 16 and release from the first mold segment 14 as the segments 14, 16 are moved apart after removal from the sleeve 12, so that subsequent lathing can be carried out using the second mold segment 16 as a mount. In such a situation, the second mold segment 16 could be made of a material such as amorphous nylon, while the first mold segment 14 may be made of a material such as polymethylpentene.

The assembly 10 may be used in either a tracking mode or a non-tracking mode. When used in a tracking mode, clearance between the cylindrical section 26 and the cylindrical section 60 should range from −0.0005 to +0.0005 inch (per side). If desired, the end 68 oil the second mold segment 16 may be used as a reference guide to determine the spacing between the faces 48, 52. As one example, the assembly 10 may be dimensioned such that the distance between the faces 48, 52 and thus the thickness of the ocular device 80 is a certain dimension when the end 68 is coplanar with the end 36. In FIG. 8, a closure mechanism 94 has a boss 95 that contacts the end 36. The mechanism also carries an adjustment plate 96 which bears against the end 68. The plate 96 is vertically adjustable relative to the boss 95 in order to vary the thickness of the device 80. When the molding material 76 comprises a perfluoroether monomer, the material 76 contracts during polymerization when the light source 78 is activated. To permit free tracking movement, the distance "A" in FIG. 8 should be equal to or greater than the shrinkage of the material 76 in a vertical direction (viewing FIG. 8) between the faces 48, 52.

Figure 9:
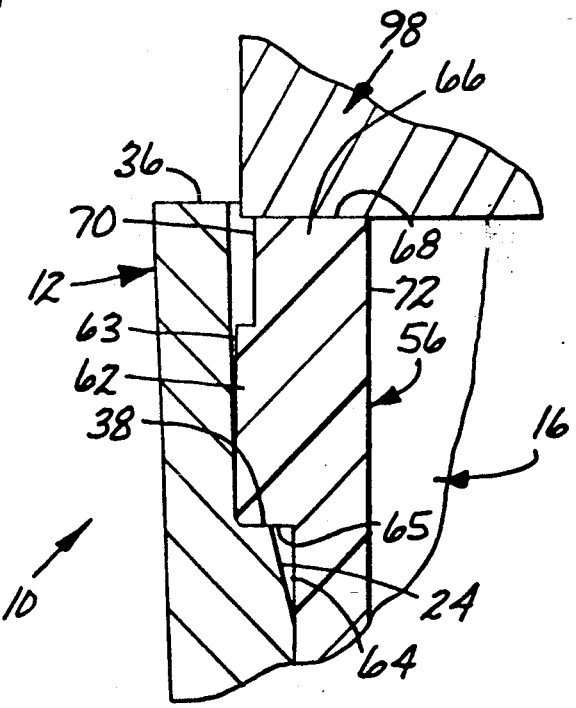
FIG. 9 is a view somewhat similar to FIG. 8 except that a different closure mechanism is shown which is useful when the assembly is used in a non-tracking mode.

When the assembly 10 is used in a non-tracking mode, the second mold segment 16 is held in a fixed position relative to the sleeve 12. In the non-tracking mode, the clearance between sections 26, 60 should range from 0.00 to 0.0005 inch per side to permit the material 76 to flow as needed between the reservoir chamber 64 and the cavity 54, such that the material 76 remains in contact with the faces 48, 52 during curing. FIG. 9 shows a closure mechanism 98 that bears against the end 68 while the sleeve 12 is supported in a fixed position. The tubular section 56 is dimensioned to enable the surface 65 to seat against the shoulder 38 when spacing between the faces 48, 52 is equal to the desired thickness of the ocular device 80.

FIG. 10 illustrates the use of a tapered mounting pin 92 for holding the second mold segment 16 along with the blank 80 during a lathing operation. The mounting pin 92 has a zero Morse taper that has been shortened from 2 inch to 1 inch and matches the configuration of the wall 72 in order to securely hold the segment 16.

As another option, the cylindrical surface 70 may be gripped by a collet such as a 0.5 inch collet (not shown) in instances where a mounting pin such as pin 92 is not available. Importantly, the outwardly extending cylindrical portion 62 greatly stiffens the tubular section 56 so that the contour of the face 52 and the blank 80 thereon are not unintentionally changed as the collet is tightened around the surface 70 or as the second mold segment 16 is mounted on pin 92.

FIGS. 2-4 illustrate preferred locations for various sprue connections used to make the assembly 10. FIG. 2 shows a sprue 86 and a disc-shaped diaphragm gate 87 coupled to an inner surface of the flange 20 of sleeve 12. Unlike other areas of the sleeve 12, the shape of the inner wall of the flange 20 is not critical and provides an ideal location for the gate 87.

FIGS. 3 and 4 show sprues 88, 90 for making the first and second mold segments 14, 16 respectively. The position of the sprues 88, 90 and accompanying gates normally provides even distribution of the material during injection molding in order to provide accurate contours on the faces 48, 52 as well as on the critical side surfaces of the segments 14, 16. Additionally, the sprue 88 functions as a handle for pulling the first mold segment 14 into the sleeve 12 so that damaging contact with the face 48 can be avoided. Using this method, a pliers-like tool used for pulling the sprue 88 could include nippers for cutting the sprue 88 and accompanying gate subsequent to installation of the segment 14 in the sleeve 12.

The sprue 90 may be removed by boring a flat surface on the top of the central section 50 in order to establish the precise thickness of the central section 50. As a consequence, the thickness of the device 80 can later be determined by measuring the combined thickness of the section 50 and device 80 (using a standard lens caliper) and then substracting the known thickness of the section 50. The outwardly projecting surface 65 serves as a reference during lathing.

If the ocular device 80 is a lens, it may be preferable to degate the segment 14 immediately after the segment 14 is molded, since the thickness of the sprue 88 might otherwise cause increased shrinkage in the center of the base 40 and thereby impair the lens optics as the segment 14 cools after molding. The degated segment 14 is drawn into the sleeve 12 by a pin such as the ejector 85 using a vacuum assist in order to seat the segment 14 against the flange 20 without contact with the contoured face 48.

I claim:

1. A mold assembly for making an ocular lens blank comprising:
   a sleeve having a passage;
   a first mold segment connected to said sleeve; and
   a second mold segment removably received in said passage at a location spaced from said first mold segment to present a mold cavity therebetween, said second mold segment including a central section and a tubular section connected to said central section, said tubular section including an outer cylindrical surface remote from said central section for gripping by a collet, said tubular section including a recess and an inner wall facing said recess having a frustoconical configuration for optional mounting by a tapered mounting pin, said tubular section including a laterally extending portion for stiffening said tubular section, said laterally extending portion being located within said sleeve.

2. The assembly of claim 1; and including a fluid seal between said sleeve and said tubular section located between said cylindrical surface and said mold cavity in order to hinder mold material in said mold cavity from contact with said cylindrical surface.

3. The assembly of claim 1, wherein said laterally extending portion circumscribes said tubular section.

4. The assembly of claim 1, wherein said laterally extending portion extends outwardly in a direction away from said recess.

5. The assembly of claim 4, wherein said laterally extending portion is substantially cylindrical.

6. The assembly of claim 1, wherein said frustoconical wall has a Morse taper.

7. The assembly of claim 6, wherein said frustoconical wall has a zero Morse taper.

8. The assembly of claim 1, wherein said central section has a convex face.

9. The assembly of claim 1, wherein said tubular section includes a projecting surface for a reference during lathing.

* * * * *